United States Patent [19]

Kawaguchi et al.

[11] Patent Number: 5,245,522
[45] Date of Patent: Sep. 14, 1993

[54] POWER SUPPLY CONTROLLED TO SUPPLY LOAD CURRENT FORMED AS SINE WAVE

[75] Inventors: Yasutsugu Kawaguchi, Tochigi; Makoto Ishii, Utsunomiya, both of Japan

[73] Assignee: Hitachi, Ltd., Tokyo, Japan

[21] Appl. No.: 792,405

[22] Filed: Nov. 15, 1991

[30] Foreign Application Priority Data

Nov. 22, 1990 [JP] Japan .................. 2-315935

[51] Int. Cl.$^5$ .................. H02M 7/155; G05F 1/70
[52] U.S. Cl. ........................ 363/37; 363/89; 363/124; 323/207; 323/222
[58] Field of Search .................. 363/37, 89, 124, 125, 363/127; 323/207, 222

[56] References Cited

U.S. PATENT DOCUMENTS 4,688,162 8/1987 Match et al. .................. 323/222 X

FOREIGN PATENT DOCUMENTS 0255258 2/1988 European Pat. Off. .
57-3579 1/1982 Japan .
59-14021 1/1984 Japan .
62-45794 9/1987 Japan .
63-22148 5/1988 Japan .

Primary Examiner—Emanuel T. Voeltz
Attorney, Agent, or Firm—Antonelli, Terry, Stout & Kraus

[57] ABSTRACT

A power supply includes a rectifying section for rectifying a sinusoidal a.c. voltage, a switching section for receiving a voltage output from the rectifying section, and a smoothing section having a smoothing capacitor. The power supply is controlled to have a sinusoidal load current and includes a power source circuit having a first path for conducting current from the rectifying section to the smoothing section and a second path for conducting current from an inductor of the switching section to the smoothing section, circuits for sensing the current flowing through the first path and forming a reference current with a target waveform based on the sensed current, circuits for sensing the current flowing through the switching element and determining a conduction ratio of the switching element to match the waveform of the sensed current to the waveform of the reference current, and a control circuit for sequentially controlling a plurality of switching elements connected in parallel based on the determined conduction ratio.

15 Claims, 12 Drawing Sheets

F I G. 7
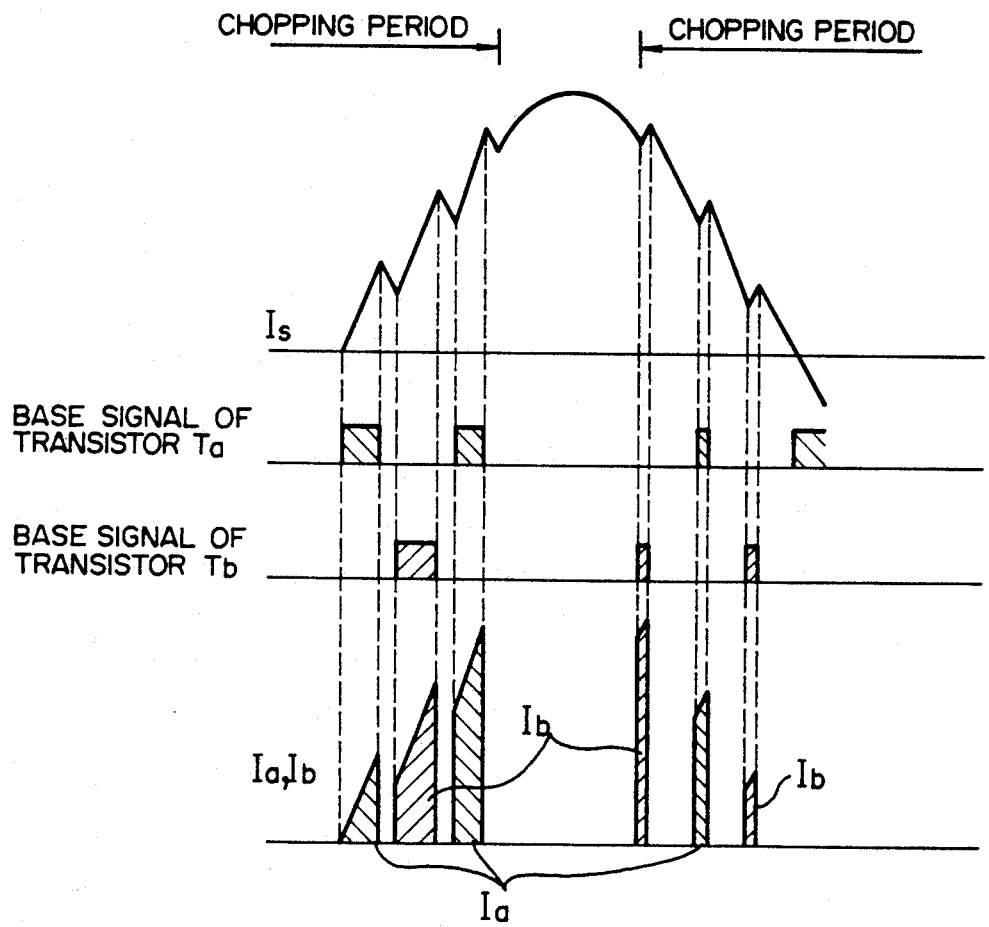

POWER SUPPLY CONTROLLED TO SUPPLY LOAD CURRENT FORMED AS SINE WAVE

BACKGROUND OF THE INVENTION

The present invention relates to a power supply for generating a d.c. voltage from a sinusoidal a.c. voltage such as a commercial a.c. voltage.

A power supply for generating a d.c. voltage from the commercial a.c. voltage is, in general, arranged to have a rectifier circuit for rectifying the a.c. voltage and a capacitor (smoothing capacitor) for smoothing the voltage output from the rectifier circuit. The voltage charged in the smoothing capacitor matches to the output voltage of the power supply.

However, the a.c. load current of the commercial a.c. power supply flows only if the a.c. voltage exceeds the voltage charged in the smoothing capacitor, that is, it does not flow if the a.c. voltage is equal to or lower than the charged voltage. Hence, the power supply having such arrangement cannot generate a sinusoidal voltage following the a.c. voltage but a pulsewise wave voltage containing many harmonic components. It results in lowering a power factor of the commercial a.c. power supply, thereby having an adverse effect on the other instruments connected to the commercial a.c. power supply.

To overcome this shortcoming, several kinds of power supplies have been conventionally proposed for enhancing a power factor of the commercial a.c. power supply by controlling load current to be similar to a sine wave. Some conventional power supplies will be described.

FIG. 13 is a circuit diagram showing a full wave rectifier disclosed in JP-B-63-22148. In FIG. 13, 1 is an a.c. power supply, 2 is an inductor, 3 is a full wave rectifier circuit, 4 is a smoothing capacitor, 5 is load, $D_1$ to $D_6$ are diodes, T is a transistor, and $R_{s1}$ to $R_{d1}$ are resistors for detecting current.

As shown, a sinusoidal a.c. supply voltage $V_s$ supplied from the a.c. power supply 1 (see FIG. 14A) is supplied to the full wave rectifier circuit 3 composed of diodes $D_1$ to $D_4$ through the inductor 2. The supply voltage $V_s$ is rectified in the full wave rectifier circuit 3 and then is smoothed in the smoothing capacitor, finally being applied to the load 5.

If only the foregoing operation is done, the a.c. power supply 1 serves to flow a.c. load current $I_s$ only if the output voltage of the full wave rectifier circuit 3 is higher than the voltage charged in the smoothing capacitor 4. Hence, this a.c. load current $I_s$ has a pulsewise waveform synchronized with a positive and a negative peaks of the a.c. supply voltage $V_s$ as shown in FIG. 14(b), resulting in lowering a power factor of the a.c. power supply 1.

The arrangement shown in FIG. 13 provides the diodes $D_5$ and $D_6$ at the a.c. terminals of the full wave rectifier circuit 3. Those diodes $D_5$ and $D_6$ and the other diodes $D_3$ and $D_4$ compose an auxiliary full wave rectifier circuit and the output voltage of the auxiliary full wave rectifier circuit is chopped by a transistor T.

The transistor T is controlled on and off in response to a driving signal $D_{rive}$ (see FIG. 14(f)) composed of an on/off signal $C_h$ (see FIG. 14(d)) having a far higher frequency than the a.c. supply voltage $V_s$ and a period control signal $V_{SP}$ (see FIG. 14(e)) representing that the a.c. load current $I_s$ is in the range of $-I_{SN} < I_S < I_{SP}$.

This arrangement results in allowing the a.c. load current $I_s$ to flow based on the on/off operation of the transistor T even during the period when the output voltage of the full wave rectifier circuit 3 is lower than the voltage charged in the smoothing capacitor 4. As shown in FIG. 14 (c), hence, the waveform of the a.c. load current $I_s$ is closer to the waveform shown in FIG. 14(b). It results in improving a power factor of the a.c. power supply 1.

The resistors $R_{s1}$ and $R_{d1}$ for sensing the current in order to detect the change of load. Depending on the sensed output of the resistors, a generator (not shown) for the driving signal $D_{rive}$ (see FIG. 14(f)) is controlled in order to adjust the period control signal $V_{SP}$ (see FIG. 14(c)), therefore, the reference values $I_{SP}$ and $I_{SN}$ (FIG. 14(c)).

FIG. 15 is a circuit diagram showing a power supply employing a voltage doubler rectifier circuit, which is disclosed in JP-B-63-22148. In FIG. 15, 4A and 4B are smoothing capacitors, 6 is a voltage doubler rectifier circuit, $D_7$ to $D_{10}$ are diodes, $T_A$ and $T_B$ are transistors, $R_{s2}$ and $R_{d2}$ are resistors for sensing current. The components corresponding to those shown in FIG. 13 have the same reference numbers.

In FIG. 15, the a.c. power voltage $V_s$ output from the a.c. power supply 1 has a polarity indicated by an arrow. The a.c. load current $I_s$ is conducted from the a.c. power supply 1 to the inductor 2, the diode 7, the smoothing capacitor 4A, and the resistor $R_{S2}$, so that the smoothing capacitor 4A is charged with the voltage at the arrow-indicated polarity. If the a.c. supply voltage $V_s$ is at an opposite polarity to the arrow, the a.c. load current $I_s$ is conducted from the a.c. power supply 1 to the resistor $R_{s2}$, the smoothing capacitor 4B, the diode $D_8$, and the inductor 2, so that the smoothing capacitor 4B is charged with the voltage at the arrow-indicated polarity.

It results in applying the addition of the charged voltages of the smoothing capacitors 4A and 4B into the load 5 as a d.c. supply voltage.

Like the power supply shown in FIG. 13, this power supply does not conduct the a.c. load current $I_s$ during the period when the a.c. supply voltage $V_s$ is equal to or lower than the voltage charged in the smoothing capacitor 4A or 4B. Hence, the a.c. load current $I_s$ has a pulsewise waveform shown in FIG. 14(b).

To overcome this shortcoming, this power supply provides a circuit composed of both the diode $D_9$ and the transistor $T_A$ connected in parallel to both the diode $D_7$ and the smoothing capacitor 4A and another circuit composed of both the diode $D_{10}$ and the transistor $T_B$ connected in parallel to both the diode $D_8$ and the smoothing capacitor 4B. If the a.c. supply voltage $V_s$ is at a polarity indicated by an arrow, like the transistor T shown in FIG. 13, the a.c. supply voltage $V_s$ is chopped by driving the transistor $T_A$ on and off. If the a.c. supply voltage is at an opposite polarity to the arrow-indicated polarity, the a.c. supply voltage is chopped by operating the transistor $T_B$ on and off.

The chopped power voltage results in having a waveform closer to a sine wave as shown in FIG. 14(c), thereby enhancing a power factor of the a.c. power supply 1.

FIG. 16 is a circuit diagram showing a power supply employing a voltage doubler rectifier circuit, which is disclosed in JP-B-62-45794. In FIG. 16, 2A and 2B are inductors, 7 is a current sensor, 8 is a hysteresis-added comparator, 9 is a driving circuit, and $D_{11}$ to $D_{14}$ are diodes. The components corresponding to those shown in FIG. 15 have the same numbers.

If the a.c. supply voltage $V_s$ supplied from the a.c. power supply 1 is at a polarity indicated by an arrow, the a.c. load current $I_s$ is flown from the a.c. power supply 1 to the inductors 2A, the diodes $D_{11}$ and $D_{12}$, the smoothing capacitor 4A, and the inductor 2B, so that the smoothing capacitor 4A is charged with the voltage. If the a.c. supply voltage $V_s$ is at an opposite polarity to the arrow-indicated polarity, the a.c. load current $V_s$ is conducted from the a.c. power supply 1 to the inductor 2B, the smoothing capacitor 4B, the diodes $D_{14}$ and $D_{13}$, and the inductor 2A, so that the smoothing capacitor 4B is charged with the voltage. This results in applying additional voltage charges in the smoothing capacitors 4A and 4B as an a.c. supply voltage to the load 5.

An npn type transistor $T_A$ is provided in parallel to the diode $D_{12}$ and the smoothing capacitor 4A and a pnp type transistor $T_B$ is provided in parallel to the diode $D_{14}$ and the smoothing capacitor 4B. The hysteresis-added comparator 8 serves to compare the current flowing through the inductor with the current sensed by the current sensor 7. Based on the compared result, as shown in FIGS. 17(a) and 17(b), the driving circuit 9 is fixed at "L" (low level) if the a.c. supply voltage $V_s$ at the arrow-indicated polarity is equal to or higher than a predetermined level $V_1$ and is fixed at "H" (high level) if the a.c. supply voltage $V_s$ at the opposite polarity to the arrow-indicated polarity is equal to or lower than a predetermined level $V_2$. The driving circuit 9 serves to produce a driving signal reversing "H" to "L" or vice versa from the other period high frequency. Based on the driving signal, the transistors $T_A$ and $T_B$ are controlled on and off.

As will be understood from the above description, if the a.c. supply voltage Vs has the arrow-indicated polarity and is equal to or lower than the voltage charged in the smoothing capacitor 4A, the transistor $T_A$ is driven on and off for chopping the a.c. supply voltage $V_s$. If the a.c. supply voltage $V_s$ is at the opposite polarity to the arrow-indicated polarity and is equal to or higher than the voltage charged in the smoothing capacitor 4B, the transistor $T_B$ is driven on and off for chopping the a.c. supply voltage $V_s$.

Like the prior art shown in FIG. 15, therefore, this prior art can provide the a.c. load current $I_s$ having a waveform closer to a sine wave as shown in FIG. 17(a) from the sinusoidal a.c. supply voltage $V_s$. It results in enhancing a power factor of the a.c. power supply 1.

The aforementioned prior arts, however, have the following problems.

(1) In the prior arts shown in FIGS. 15 and 16, if the a.c. load current $I_s$ is in the range from the reference value $I_{sp}$ to $I_{sn}$, the waveform of the a.c. load current $I_s$ is not constantly sinusoidal, because the waveform depends merely on the conduction ratio of the transistors T, $T_A$ and $T_B$.

In the prior art shown in FIG. 16, depending on the magnitude of the load, the reference values change in a predetermined sinusoidal manner as shown by a broken line and a two-dot chain line shown in FIG. 17. Hence, the a.c. load current $I_s$ can have a relatively excellent sinusoidal waveform, resulting in being able to reduce the harmonic wave and enhance a power factor. Since, however, the transistors $T_A$ and $T_B$ are controlled on and off depending on the above-mentioned reference values only, there exists a period when the switching is carried out at a high frequency without defining the chopping frequency. It results in causing an impractically large switching loss.

(2) In the aforementioned prior arts, as the switching frequency for the transistor T, $T_A$ or $T_B$ becomes higher, the waveform of the a.c. load current $I_s$ is made more sinusoidal. In this case, however, the diodes $D_1$ and $D_2$ shown in FIG. 13, the diodes $D_7$ and $D_8$ shown in FIG. 15, or the diodes $D_{12}$ and $D_{14}$ shown in FIG. 16 may be delayed due to the forward-biased or reverse-biased state. Those diodes serve as a capacitive load when the transistors T, $T_A$ and $T_B$ are switched on. On the other hand, when the transistors T, $T_A$ and $T_B$ are switched off, the inductor serves as an inductive load until the diodes enter into the forward-biased state, resulting in flowing excessive current, thereby increasing the switching loss. As a result, though the average a.c. load current is small, the transistors T, $T_A$ and $T_B$ are required to have large capacitance, because it is necessary to consider the switching loss.

(3) As will be apparent from the above description, to obtain a sinusoidal a.c. load current from the foregoing prior arts, as the on/off switching frequency for the transistor T, $T_A$ or $T_B$ becomes higher, the waveform of the a.c. load current becomes more precisely sinusoidal. Further, to reduce the inductor and the capacitor in size, it is necessary to perform the high-frequency switching operation. In the above-mentioned prior arts, however, it is necessary to perform the high-frequency switching operation of large current flown when the voltage is high for charging the smoothing capacitors, resulting in enlarging the switching loss. Hence, the conventional circuits have difficulty in performing the high-frequency switching operation.

SUMMARY OF THE INVENTION

It is an object of the present invention to provide a power supply which is capable of keeping the waveform of the a.c. load current sinusoidal at high accuracy and reducing the loss caused at the switching elements for chopping the a.c. supply current.

It is a further object of the present invention to provide a power supply which is capable of using a small-capacitance switching element as a switching element for chopping.

It is yet another object of the present invention to provide a power supply which is capable of reducing the loss of the switching element for chopping independently of the magnitude of the loss.

In carrying out the object, the power supply according to an aspect of the present invention takes the operating steps of sensing the current flowing through the switching element for chopping or the rectified a.c. load current, comparing the waveform of the current with the predetermined target waveform of a reference current, and controlling the switching element on and off at a conduction ratio at which both of the waveforms are matched to each other.

In carrying out the other objects, the power supply according to another aspect of the present invention is arranged to supply current to a smoothing section through a first passage led from the output of a rectifier section and a second passage leading through the inductor of the switching section and have a switching element restricted to flow the switching current only, for reducing the unnecessary switching loss.

For the switching element for chopping, a plurality of semiconductor switches or switching sections connected in parallel are provided. The on-state periods of those semiconductor switches or switching sections are shifted on time in sequence, for the purpose of reducing the switching loss per one switching element.

As described above, the power supply according to the present invention operates to sense the current, compare the waveform of the sensed current with the predetermined target waveform of the reference current, and control the switching element on and off in a manner to match both waveforms to each other. Hence, the power supply can provide an accurate sinusoidal a.c. load current, resulting in greatly enhancing a power factor of the power supply.

Further, the power supply according to the present invention is capable of reducing the current flown through the switching element for chopping and the on-state voltage loss or switching loss in the switching element, resulting in reducing the capacitance of and the size of the switching element.

BRIEF DESCRIPTION OF THE DRAWINGS

FIG. 7 is a plot showing the operation of the embodiment shown in FIG. 6;

DESCRIPTION OF THE PREFERRED EMBODIMENTS

Figure 1:
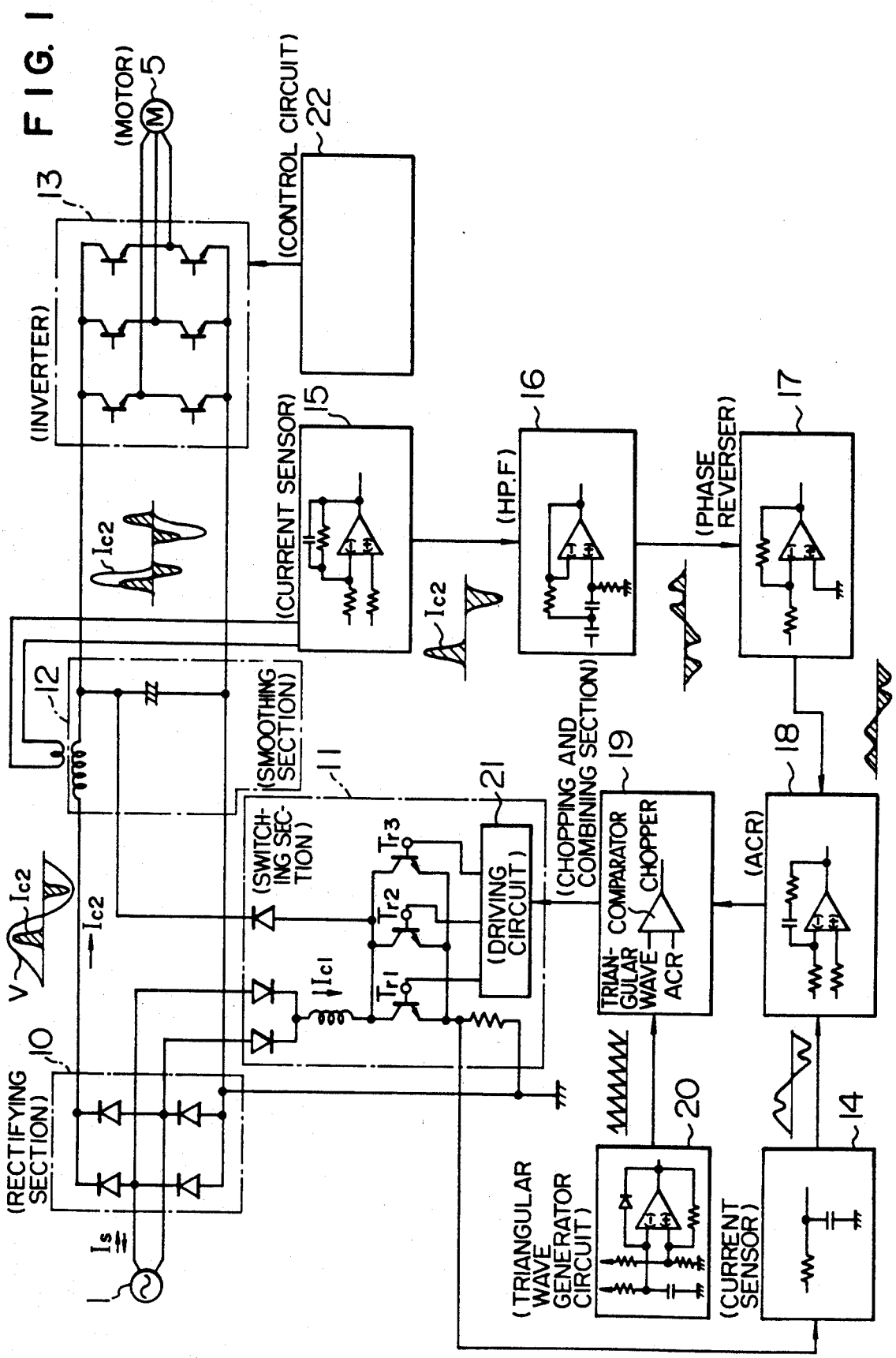
FIG. 1 is a block diagram showing a power supply according to an embodiment of the present invention.

Herein, embodiments of the present invention will be described as referring to the drawings.

FIG. 1 is a block diagram showing a power supply according to an embodiment of the present invention. 10 is a rectifier section, 11 is a switching section, 12 is a smoothing section, 13 is an inverter, 14 and 15 are current sensors, 16 is a high-pass filter, 17 is a phase inverter, 18 is an automatic current regulator (ACR), 19 is a chopping and combining circuit, 20 is a triangular wave generator circuit, 21 is a driving circuit, and 22 is a control circuit. The current waveform of each section is also shown in FIG. 1.

In FIG. 1, the a.c. supply voltage $V_s$ output from the a.c. power supply 1 is rectified in the rectifying section 10 and is sent to the switching section 11. The switching section 11 is composed of an inductor and switching elements (Tr1, Tr2, Tr3). When the output voltage of the rectifying section 10 is higher than the voltage charged in the smoothing capacitor of the smoothing section 12, the current is conductor from the rectifying section 10 to the smoothing capacitor through the inductor and charges the smoothing capacitor. The switching elements are controlled on and off by the driving circuit 21. When the switching element is controlled on, the a.c. load current $I_s$ sent from the a.c. power supply 1 through the rectifying section 10 flows through the inductor and the switching element, so that the energy is stored in the inductor. When the switching element is switched off, the inductor emits the stored energy as a high voltage. This results in current flowing from the inductor through the smoothing section 12, the rectifying section 10 and the a.c. power supply 1.

Even if the output voltage of the rectifying section 10 is higher than the voltage charged in the smoothing capacitor, the switching element is controlled on and off. Part of the current output from the rectifying section 10 is conducted to the smoothing capacitor through the inductor.

Assuming that the current conducted into the smoothing section through the inductor is $I_{c2}$ and the current supplied to the switching section 11 for chopping is $I_{c1}$, the load current $I_s$ can be represented by the equation indicated below:

$$I_s = I_{c1} + I_{c2} \tag{1}$$

Figure 2:
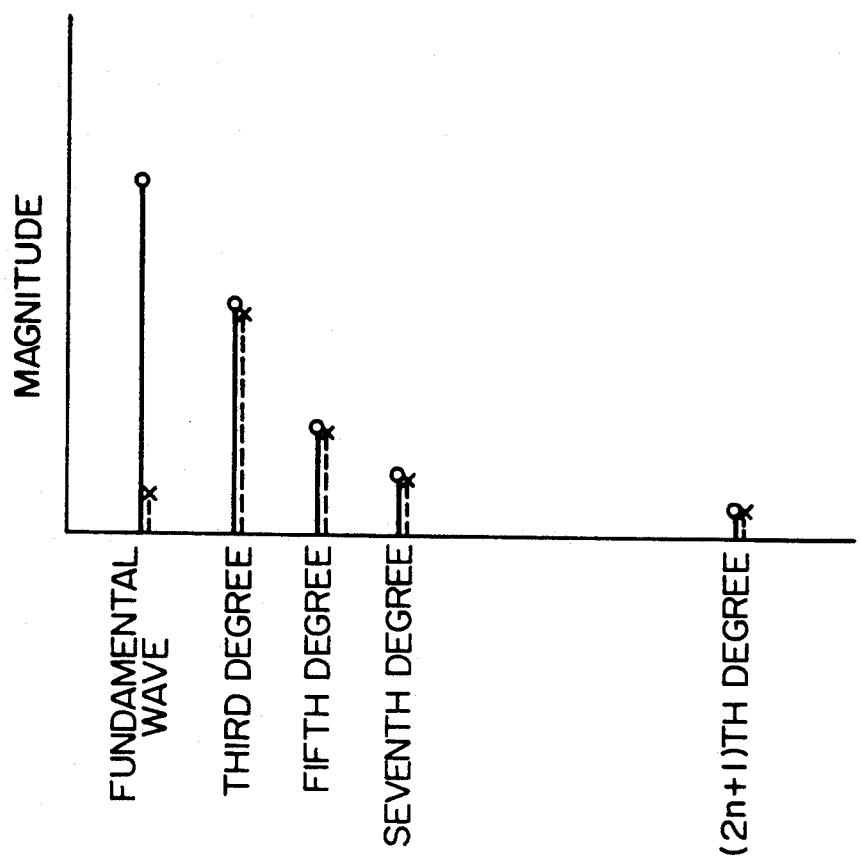
FIG. 2 is a plot showing an effect of a high-pass filter included in the embodiment shown in FIG. 1.

The current sensor 15 serves to sense the current $I_{c2}$ supplied to the smoothing section 12. The current $I_{c2}$ contains three or more degrees harmonics. From the current $I_{c2}$, only the harmonic components are extracted by the high-pass filter 16 having a higher cut-off frequency than the frequency of the a.c. supply voltage $V_s$. FIG. 2 shows the effect of the high-pass filter 16. In FIG. 2, each mark "○" indicates the component of the input current $I_{c2}$ of the high-pass filter 16 and each mark "X" indicates the component of the output current of the high-pass filter 16. That is to say, the output current of the high-pass filter 16 is a result of attenuating the fundamental component having the same frequency as the a.c. supply voltage from the current $I_{c2}$.

Figure 3:
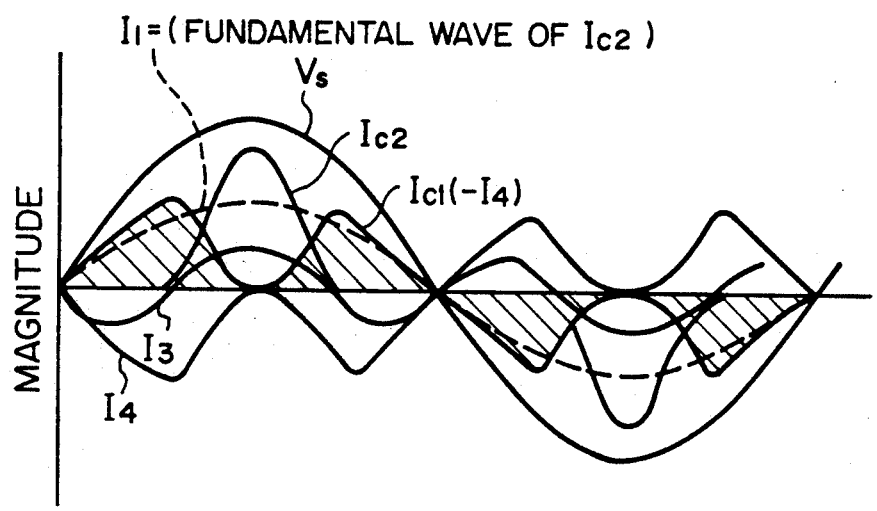
FIG. 3 is a plot showing a current waveform for describing principles of the present invention.

In FIG. 3, $I_1$ is the fundamental component of the current $I_{c2}$, $I_3$ is a third or more degree harmonic component, and $I_4$ is the output current of the high-pass filter 16. The output current $I_4$ of the high-pass filter 16 is a result of combining all the harmonics. The phase of the output current $I_4$ of the high-pass filter 16 is reversed by 180° at the phase reverser 17, and the resulting current $I_4$ is supplied to the automatic current regulator 18 as a reference current $(-I_4)$.

On the other hand, the current sensor 14 serves to sense the current $I_{c1}$ to be chopped in the switching section 11 and supply the sensed current $I_{c1}$ to the automatic current regulator 18. The automatic current regulator 18 compares the sensed current $I_{c1}$ with the reference current sent from the phase reverser 17 and controls the waveform of the current $I_{c1}$ to be equal to the waveform of the reference current $(-I_4)$ during the period when the reference current is flowing. That is, the automatic current regulator 18 and the chopping and combining circuit 19 defines such a conduction ratio of the switching section as establishing the equation of:

$$I_{cl} = -I_4 \qquad (4)$$

The chopping and combining circuit 19 serves to produce a pulse signal depending on a conduction ratio defined from a triangular wave signal output from the triangular wave generator circuit 20. Based on the pulse signal, the driving circuit 21 serves to control on and off the switching element included in the switching section 11.

Then, the equation (1) can be interpreted as follows:

$$\begin{aligned} I_s &= I_{c1} + I_{c2} \\ &= I_{c1} + \{\text{fundamental components of } I_{c2} + \text{harmonic components of } I_{c2}\} \\ &= I_{c1} + I_1 + I_4 \end{aligned}$$

Thus, from the equation (2)

$$I_s = I_1 = \text{fundamental components } I_{c2}$$

It means that the a.c. load current $I_s$ has a sine wave.

According to the above arrangement, if the a.c. load current $I_s$ is partially lower than the reference current $(-I_4)$, the automatic current regulator 18 serves to increase the conduction ratio of the switching elements $T_{r1}$, $T_{r2}$, $T_{r3}$, thereby keeping the load current sinusoidal.

According to this embodiment, the switching section 11 cancels the harmonic components of the current $I_{c2}$, so that the a.c. load current $I_s$ is allowed to be constantly kept sinusoidal independently of the type and the magnitude of the load.

As is apparent from the above description, the triangular wave generator circuit 20 serves to define the maximum switching frequency of the switching element included in the switching section 11. Unlike the prior arts, therefore, part of the switching frequency is not allowed to be abnormally higher. This results in reducing the switching loss of the switching element.

Having described the smoothing section served as the load of the switching section, the similar control is made possible if the later stage of the current sensor or the output of the switching section is directly connected to another load such as a control power supply or another motor.

Further, the present embodiment has described that the current $I_{c2}$ is sensed by winding a secondary coil around the inductor of the smoothing section. In place, the use of a hole element sensor makes it possible to directly sense the waveform of the current.

Figure 4:
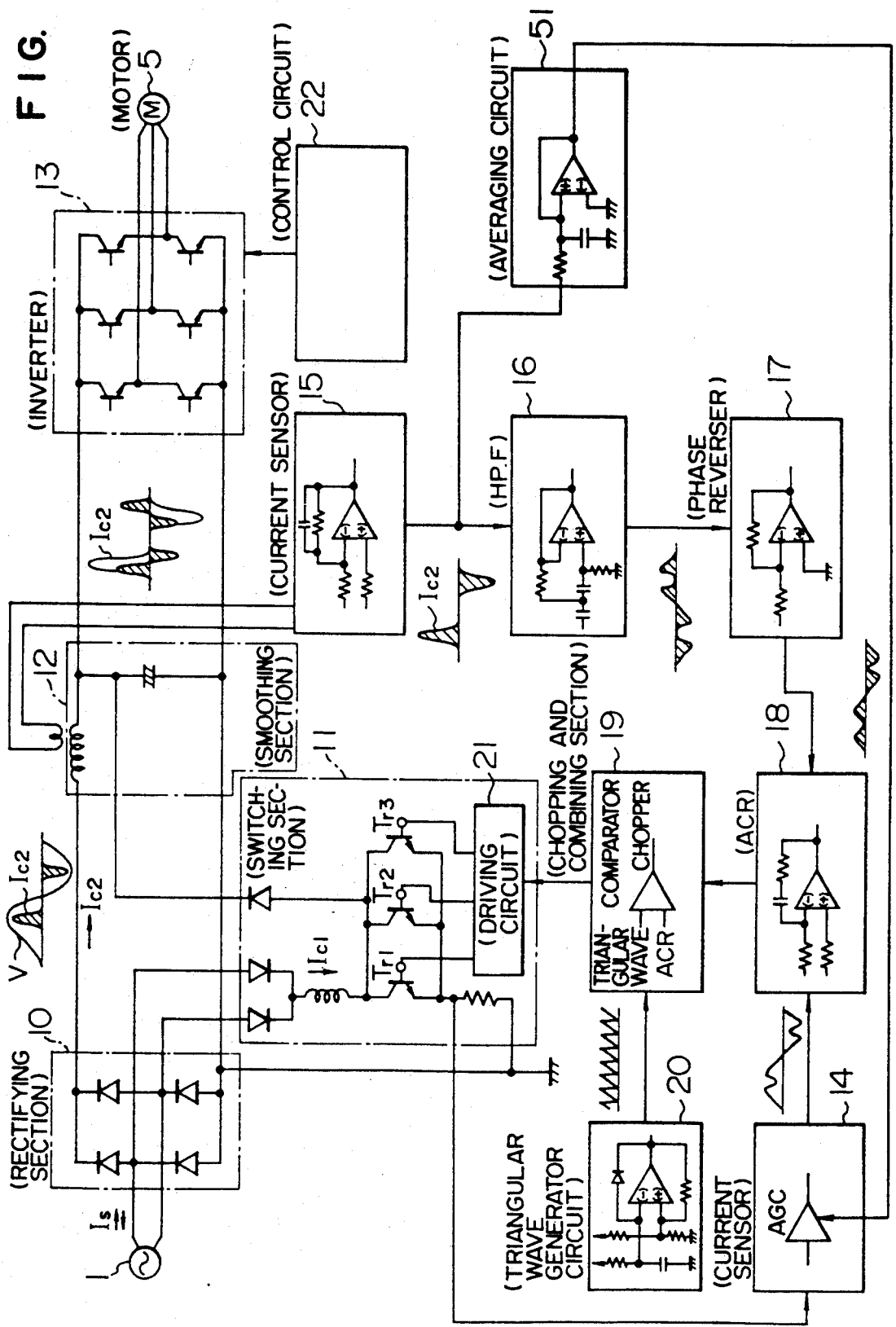
FIGS. 4 and 5 are block diagram showing a power supply according to another embodiment of the present invention.

FIG. 4 shows a power supply according to another embodiment of the present invention. This embodiment is analogous to the embodiment shown in FIG. 1 except provision of an averaging circuit 51.

In FIG. 1, consider that the current sensors 14 and 15 have respective amplification factors or accuracies. In this case, an error appears about the compared result between the current $I_{cl}$ and the reference current $(-I_4)$ in the automatic current regulator 18. The appearance of the error results in having an adverse effect on the a.c. load current $I_s$. For example, if the current sensor 14 has a smaller amplification factor than the current sensor 15, the switching section 11 works to set a larger conduction ratio of the switching element, resulting in intensifying a three-degree harmonic, thereby distorting the waveform of the a.c. load current. Conversely, if the current sensor 14 has a larger amplification factor than the current sensor 15, the conduction ratio is set smaller, resulting in distorting the waveform of the a.c. load current as well.

To overcome this shortcoming the, in arrangement shown in FIG. 4, the current $I_{c2}$ sensed by the current sensor 15 is averaged in the averaging circuit 51. The resulting averaged signal is used to control the amplification factor of the current sensor 14. Concretely, the amplification factors of the current sensors 14 and 15 may be controlled (for example, to be equal to each other) so that the a.c. load current $I_s$ is made sinusoidal.

Figure 5:
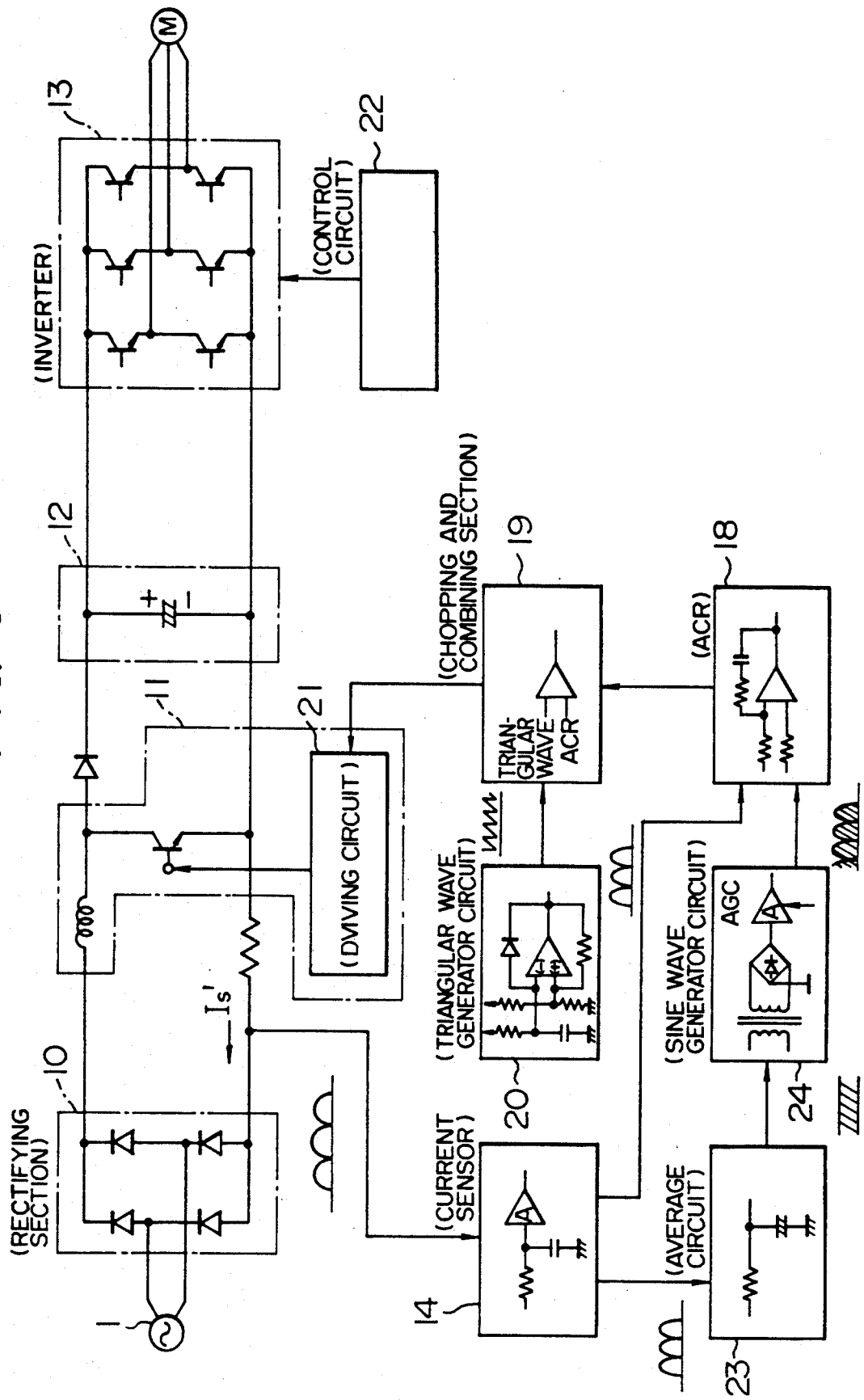

FIG. 5 shows a power supply according to another embodiment of the present invention. In place of the current sensor 15, the high-pass filter 16 and the phase reverser circuit 17 shown in FIG. 1, the averaging circuit 23 and the sinusoidal wave generator circuit 24 are used and the current sensor 14 is used for sensing the current $I_s'$ output from the rectifying section 10.

The averaging circuit 23 serves to sense an average value of the current $I_s'$ sensed by the current sensor 14. The sinusoidal wave generator circuit 24 serves to generate a sinusoidal wave current having the same frequency as the a.c. supply voltage $V_s$ and the amplitude defined according to the averaged value and is sent as a reference current to the automatic current regulator 18. The automatic current regulator 18 serves to define such a conduction ratio for the switching element as matching the waveform of the current $I_s'$ sensed by the current sensor 14 to that of the reference current.

According to the present embodiment, the conduction ratio is defined as monitoring the waveform of the current like the foregoing embodiments shown in FIGS. 1 and 4. Hence, this embodiment has the same advantages as those foregoing embodiments. Further, this embodiment may be arranged to control the current waveform with low-capacitance switching elements if it has a plurality of switching elements connected in parallel and controlled on and off in sequence.

Figure 6:
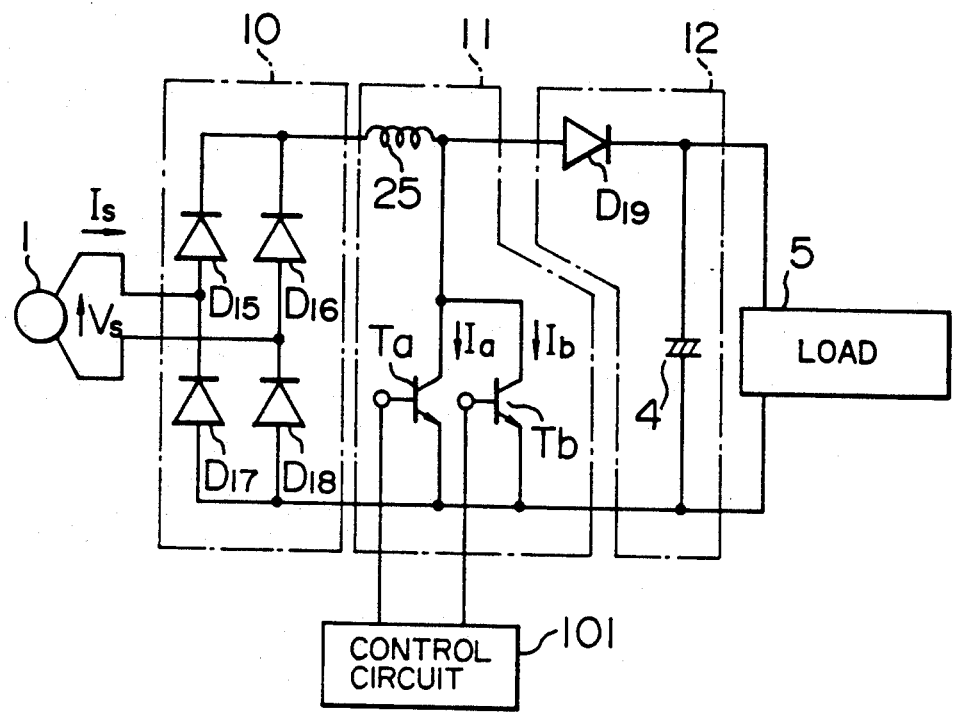
FIG. 6 is a block diagram showing a power supply according to another embodiment of the present invention.

FIG. 6 is a circuit diagram showing a power supply according to another embodiment of the present invention. In FIG. 6, 4 is a capacitor, 25 is an inductor, $D_{15}$ to $D_{19}$ are diodes, $T_a$ and $T_b$ are transistors. The components corresponding to those shown in FIG. 1 have the same reference numbers.

In FIG. 6, the rectifying section 10 is composed of the diodes $D_{15}$ to $D_{18}$ for performing the full wave rectification of the a.c. supply voltage $V_s$. The switching section 11 is composed of an inductor 25 and two transistors $T_a$ and $T_b$. The smoothing section 12 is composed of the diode $D_{19}$ and the smoothing capacitor 4. The inductor 25, the diode $D_{19}$, and the smoothing capacitor 4 are connected in series between two output terminals of the rectifying section 10. The series connection of the diode $D_{19}$ and the smoothing capacitor 4 is connected to the two transistors $T_a$ and $T_b$ connected in parallel.

Next, the operation of this embodiment will be described as referring to FIG. 7.

In case that the voltage charged in the smoothing capacitor 4 is lower than the output voltage of the rectifying section 10, the diode $D_{19}$ is forward-biased and the transistors $T_a$ and $T_b$ are set off. It results in making the output voltage of the rectifying section 10 smoothed by the voltage charged in the smoothing capacitor 4 and applying the smoothed voltage as a d.c. supply voltage to the load 5. The voltage charged in the smoothing capacitor 4 depends on the magnitude of the load 5 and the constants of the inductor 25 and the smoothing capacitor 4. In general, however, the charged voltage is close to the a.c. supply voltage $V_s$.

In case that the voltage charged in the smoothing capacitor 4 is higher than the voltage output by the rectifying section 10, the diode $D_{19}$ is reverse-biased. Hence, if the transistors $T_a$ and $T_b$ are not operative, no a.c. load current $I_s$ flows and thus the a.c. load current $I_s$ has a waveform containing lots of three-degree harmonics, resulting in lowering a power factor of the a.c. power supply 1.

To overcome this shortcoming, with the control circuit 101 using two systems of chopper circuits, the transistors $T_a$ and $T_b$ are controlled on and off in a manner that the transistors $T_a$ and $T_b$ are alternately switched on. In the area where the voltage output by the rectifying section 10 is high, the control circuit 101 serves to reduce the on-state period of the transistor $T_a$ or $T_b$ for reducing the switching loss.

With the transistor $T_a$ or $T_b$ being switched on, the current $I_a$ or $I_b$ flows from the rectifying section 10 to the inductor 25 and the transistor $T_a$ or $T_b$, resulting in storing energy in the inductor 25. With the transistors $T_a$ and $T_b$ being switched off, the inductor 25 works to emit the stored energy as a high voltage. It results in being able to flow current from the inductor 25 to the diode $D_{19}$, the smoothing capacitor 4, the diode $D_{17}$ or $D_{18}$, the a.c. power supply 1, and the diode $D_{15}$ or $D_{16}$.

This operation makes it possible to conduct the a.c. load current $I_s$ when the output voltage of the rectifying section 10 is lower than the voltage charged in the smoothing capacitor 4. The transistors $T_a$ and $T_b$ are controlled on and off so that the a.c. load current $I_s$ can have a sinusoidal waveform.

As mentioned above, this embodiment is arranged to alternately control the two transistors $T_a$ and $T_b$ on and off. The amount of current conducted through each of the two transistors $T_a$ and $T_b$ is made smaller than the amount or current conducted through a single transistor. It results in reducing the on-state voltage loss and the switching loss of the transistors $T_a$ and $T_b$. Thus, small-capacitance transistors may be used for the transistors $T_a$ and $T_b$.

Though the number of the transistors used in the power supply is two, since those transistors have small capacitance, they can be accommodated as small-capacitance module components or a one-chip component in a single package. This results in reducing the overall power supply in size. The power supply according to this embodiment can be easily made from the conventional power supply in light of the circuit arrangement.

Figure 8:
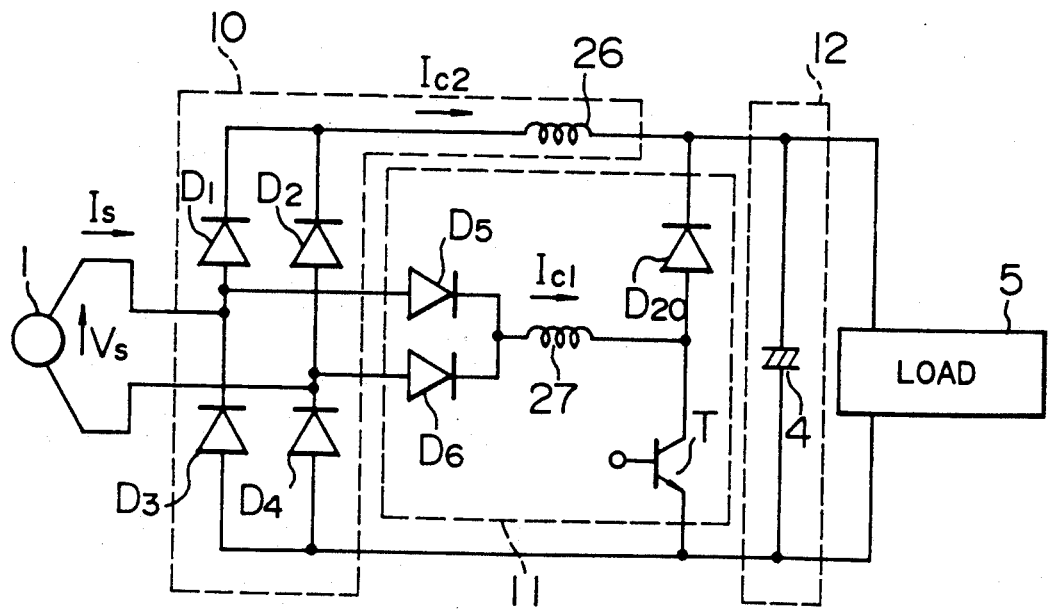
FIG. 8 is a circuit diagram showing a power supply according to another embodiment of the present invention.

FIG. 8 is a circuit diagram showing a power supply according to another embodiment of the present invention. In FIG. 8, 26 and 27 are inductors and $D_{20}$ is a diode. The components corresponding to those shown in FIGS. 1 and 13 have the same reference numbers.

Figure 13:
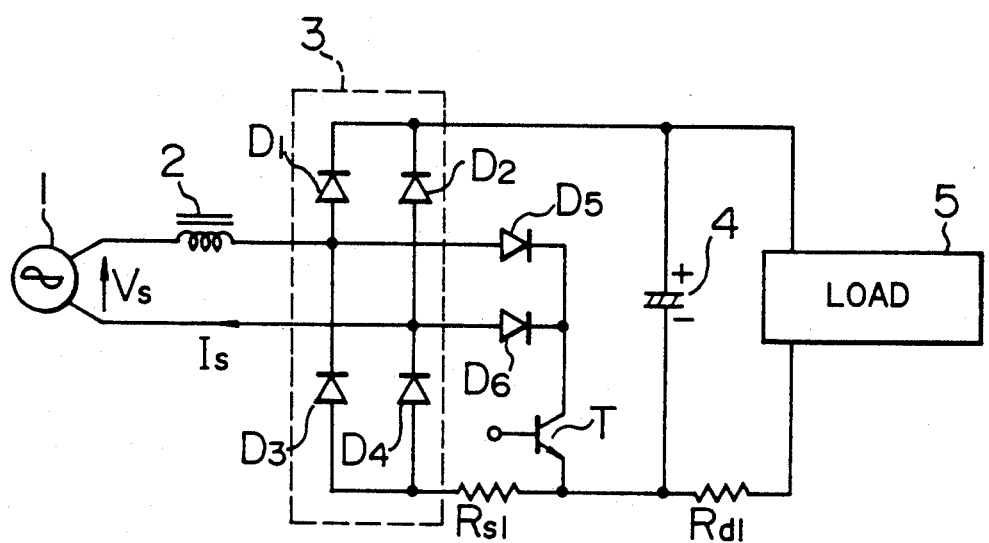
FIG. 13 is a circuit diagram showing one example of a conventional power supply.
Figure 14:
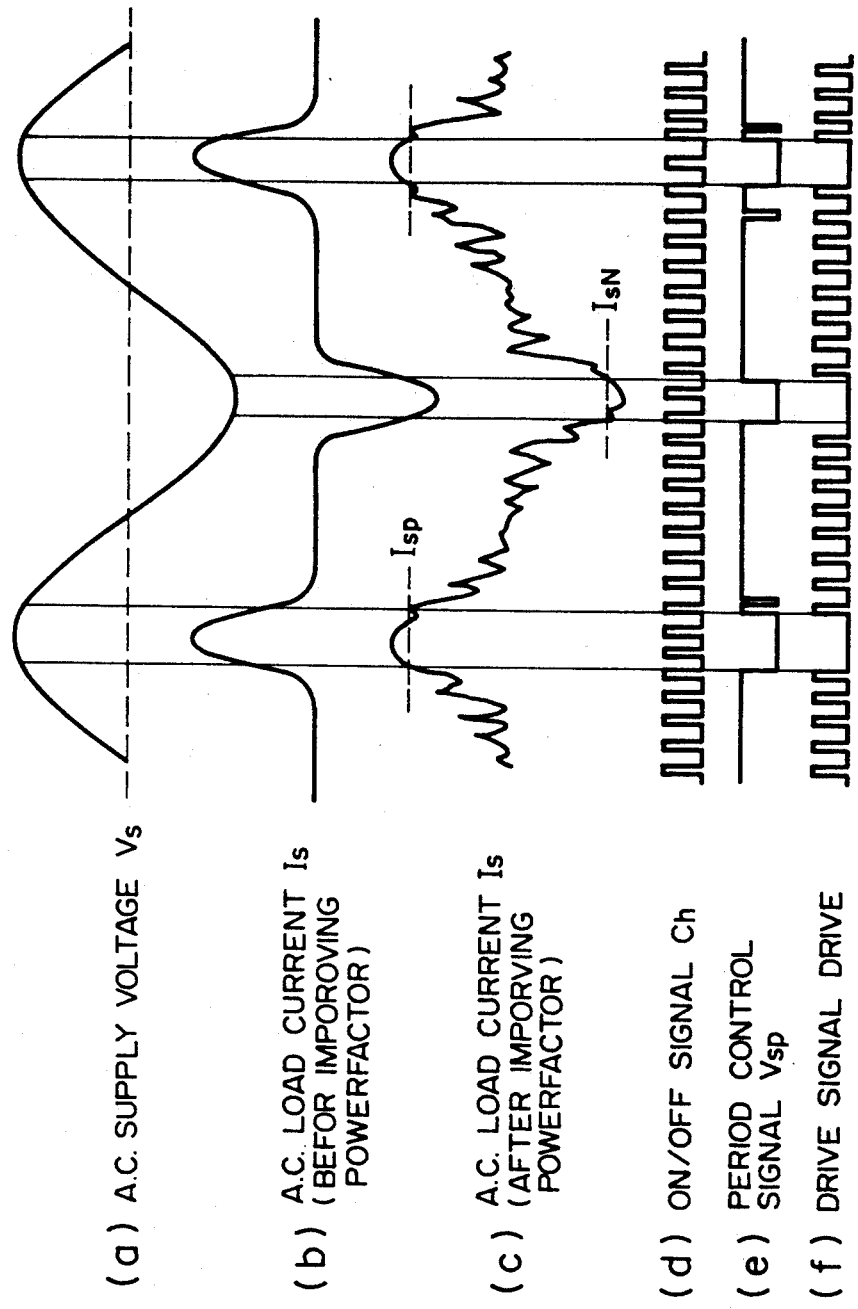
FIG. 14 is a plot showing a voltage, a current, and a signal waveform of each section shown in FIG. 13.
Figure 15:
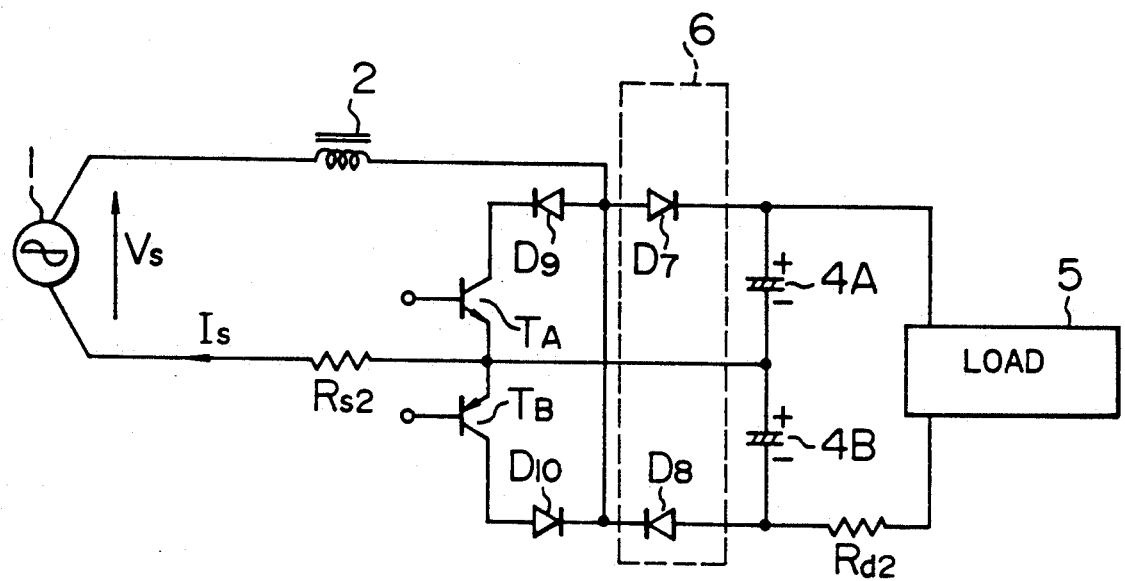
FIGS. 15 and 16 are circuit diagrams showing another example of a conventional power supply, respectively.

The present embodiment has the similar arrangement to the conventional power supply shown in FIG. 13 except that the current is supplied to the smoothing section through two current passages, that is, a current passage led from the rectifying section 10 and the other current passage composed of the inductor 27 and the diode $D_{20}$ of the switching section 11. Concretely, this embodiment is arranged to provide in a rectifying section 10 an inductor 26 between an output terminal of the rectifying section 10 and cathodes of diodes $D_1$ and $D_2$ and in a switching section 11 another inductor 27 between cathodes of diodes $D_5$ and $D_6$ and a collector of the transistor T. The collector of the transistor T is connected to the output terminal of the rectifying section 10.

Next, the operation of this embodiment will be described.

When an absolute value of the a.c. supply voltage $V_s$ is higher than a voltage charged in the smoothing capacitor 4, the transistor T is switched off, so that the a.c. supply voltage $V_s$ is full-wave rectified by the full wave rectifying circuit composed of the diodes $D_1$ to $D_4$ of the rectifying section 10 and is smoothed in the smoothing capacitor 4. The smoothed voltage is applied as a d.c. supply voltage to the load 5. At this time, the charging current $I_{c2}$ is flown from the diode $D_1$ or $D_2$ to the smoothing capacitor 4 through the inductor 26. The inductor 26 serves to remove high-frequency components such as noise from the charging current $I_{c2}$.

Consider that the absolute value of the a.c. supply voltage $V_s$ is low enough to make the output voltage of the full wave rectifier circuit composed of the diodes $D_1$ to $D_4$ lower than the voltage charged in the smoothing capacitor 4. The diodes $D_1$ to $D_4$ are reverse-biased, resulting in reducing the current $I_{c2}$ flowing through the inductor 26 to zero. The resulting current $I_{c2}$ has a waveform containing many three-degree harmonics as shown in FIG. 9.

During the period when the smoothing capacitor is not charged, the transistor T is controlled on and off for chopping the current $I_{c1}$ output from the full wave rectifier circuit composed of the diodes $D_3$ to $D_6$ included in the rectifying section 10. During the on-state period of the transistor T, the current $I_{c1}$ is conducted from the power supply 1 to the diode $D_5$ or $D_6$, the inductor 27, the transistor T, the diode $D_4$ or $D_3$. The inductor 27 stores the current $I_{c1}$ as energy. During the off-state period of the transistor T, the inductor 27 emits the stored energy as a high voltage. It results in being able to flow the current $I_{c1}$ from the inductor 27 to the diode $D_{20}$, the smoothing capacitor 4, the diode $D_4$ or $D_3$, the a.c. power supply and the diode $D_5$ or $D_6$.

Figure 9:
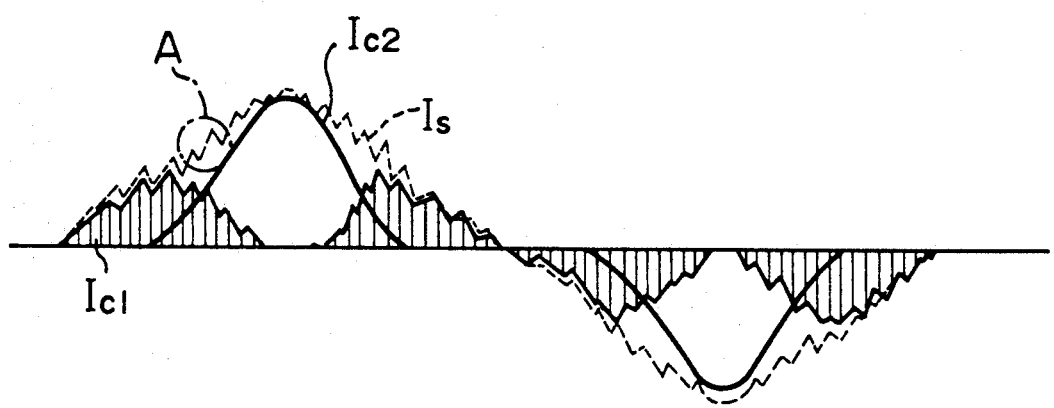
FIG. 9 is a plot showing a current waveform of each of the sections of the embodiment shown in FIG. 8.

FIG. 9 shows the waveform of the current $I_{c1}$ supplied by the above-mentioned operation. The a.c. load current $I_s$ of the a.c. power supply 1 is a combined current of the currents $I_{c1}$ and $I_{c2}$. The waveform of the a.c. load current $I_s$ is close to a sine wave as shown in FIG. 9.

Figure 10:
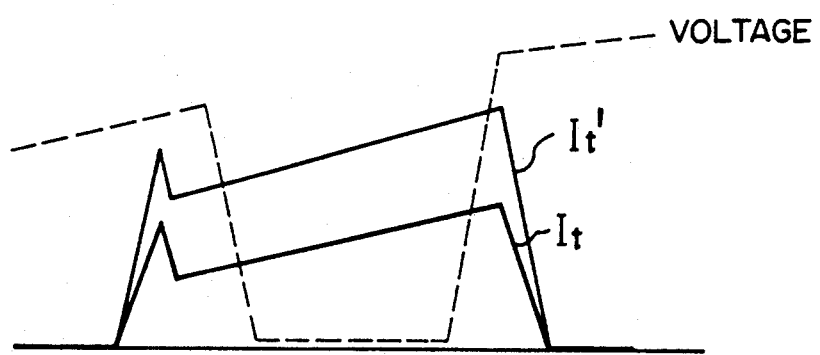
FIG. 10 is a current waveform showing current flown when the transistor shown in FIG. 8 is switched on and off.

At a time point A of FIG. 9, consider that the current $I_t$ flown when the transistor T is switched on and off in this embodiment is compared with the current $I_t'$ when the transistor T is switched on and off in the embodiment shown in FIG. 13. In case that the charging current is supplied to the smoothing capacitor through a single current passage as in the embodiment shown in FIG. 13, the switching current is an added current of the switching current and the charged current as shown by a broken line of FIG. 9. Hence, the switching operation is performed for the large current $I_t'$ as shown in FIG. 10.

However, the arrangement of a 2-path circuit as shown in FIG. 8 makes it possible to use only the current $I_{c1}$ for the switching operation. It results in subtracting the charged current from the added current shown in FIG. 9, that is, being able to flow the current shown by $I_t$ of FIG. 10 through the transistor.

Hence, the embodiment shown in FIG. 8 is capable of reducing the on-state voltage loss and the switching loss of the transistor T as compared with the embodiment shown in FIG. 13, resulting in reducing the capacitance and the size of the transistor T.

Figure 11:
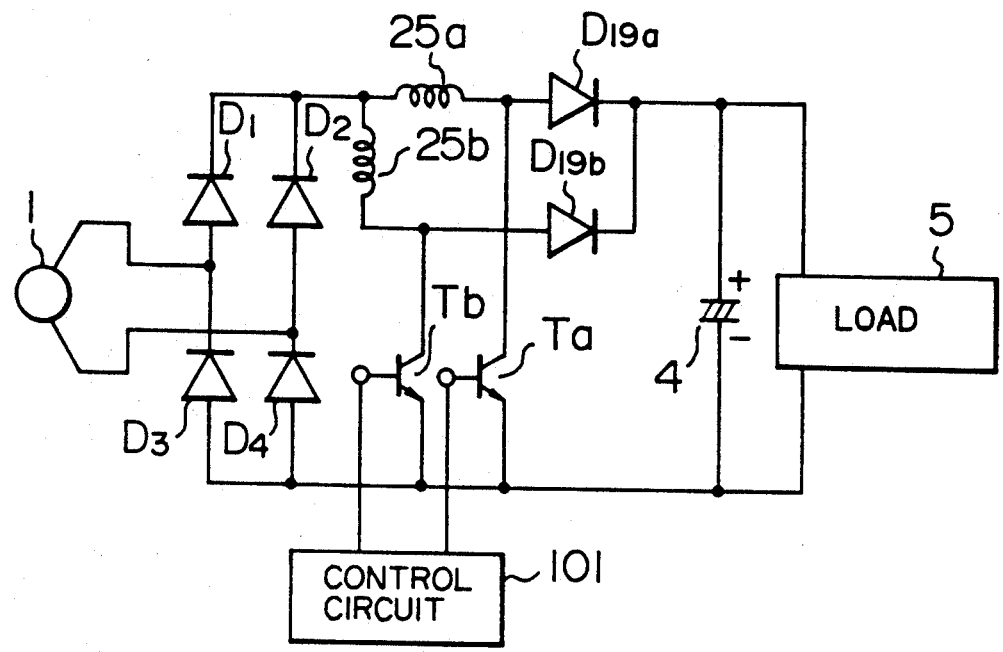
FIGS. 11 and 12 are circuit diagrams showing a power supply according to another embodiment of the present invention, respectively.

FIG. 11 is a circuit diagram showing a power supply according to another embodiment of the present invention. In FIG. 11, 25a and 25b are inductors, $D_{19a}$ and $D_{19b}$ are diodes, $T_a$ and $T_b$ are transistors. The components corresponding to those shown in the above-indicated drawings have the same reference numbers.

In FIG. 11, if the voltage charged in the smoothing capacitor 4 is lower than the output voltage of the full wave rectifier circuit composed of the diodes $D_1$ to $D_4$, the charging is done in the smoothing capacitor 4.

If the output voltage of the full wave rectifier circuit is lower than the voltage charged in the smoothing capacitor 4, the control circuit 101 serves to alternately control the transistors $T_a$ and $T_b$ on and off. The control circuit 101 contains two systems of normal chopper circuits. With the transistor $T_a$ being switched on, the current is flown from the full wave rectifier circuit to the inductor 25a and the transistor. The current is stored as energy in the inductor 25a. With the transistor $T_a$ being switched off, the inductor 25a emits the stored energy as a high voltage, resulting in being able to flow current from the inductor 25a to the diode $D_{19a}$, the smoothing capacitor 4, the diode $D_4$ or $D_3$, the a.c. power supply 1, and the diode $D_1$ or $D_2$.

Next, with the transistor $T_b$ being switched on, likewise, the inductor 25b stores energy. With the transistor $T_b$ being switched off, the inductor 25b emits the charged energy, resulting in being able to flow current from the inductor 25b to the diode $D_{19b}$ and the above components.

By repeating the above operations, the a.c. power supply 1 is capable of supplying the a.c. load current $I_s$ having a waveform close to a sine wave.

Like the embodiment shown in FIG. 13, the power supply according to the present embodiment (FIG. 11) can lower the on-state voltage loss and the switching loss of the transistors $T_a$ and $T_b$ as compared, to the power supply using a single transistor. This results in reduction of the the capacitance and the size of the used transistors $T_a$ and $T_b$.

Figure 12:
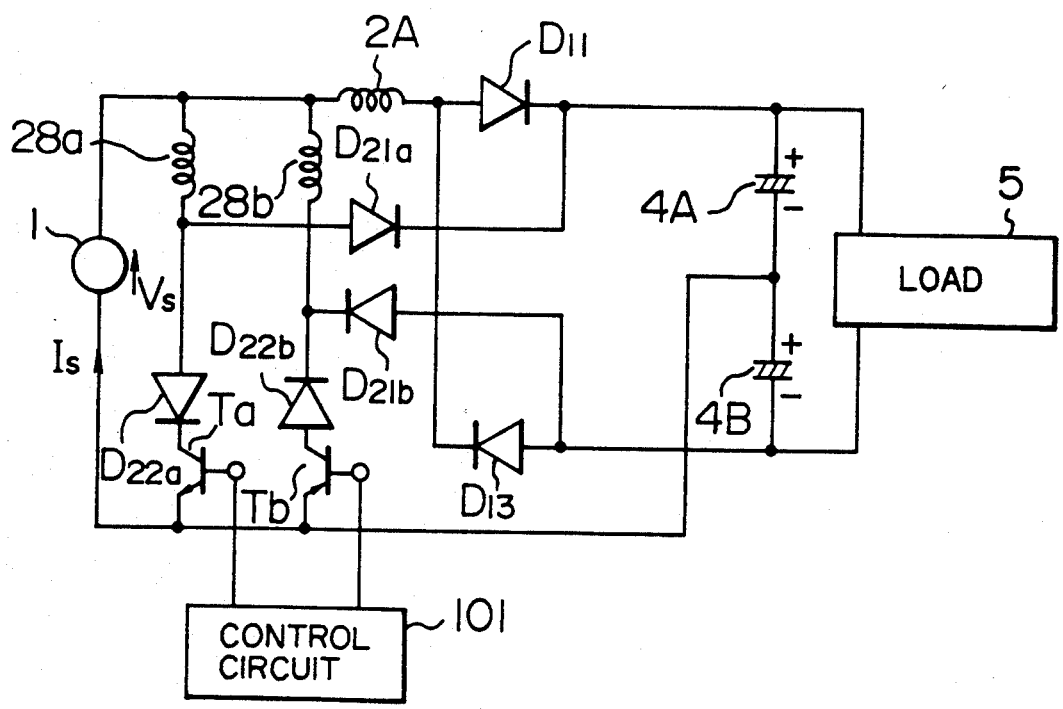

FIG. 12 is a circuit diagram showing a power supply according to an embodiment of the present invention. In FIG. 12, 28a and 28b are inductors, $D_{21a}$, $D_{21b}$, $D_{22a}$ and $D_{22b}$ are diodes, and $T_a$ and $T_b$ are transistors. The components corresponding to those shown in FIG. 16 have the same reference numbers.

Figure 16:
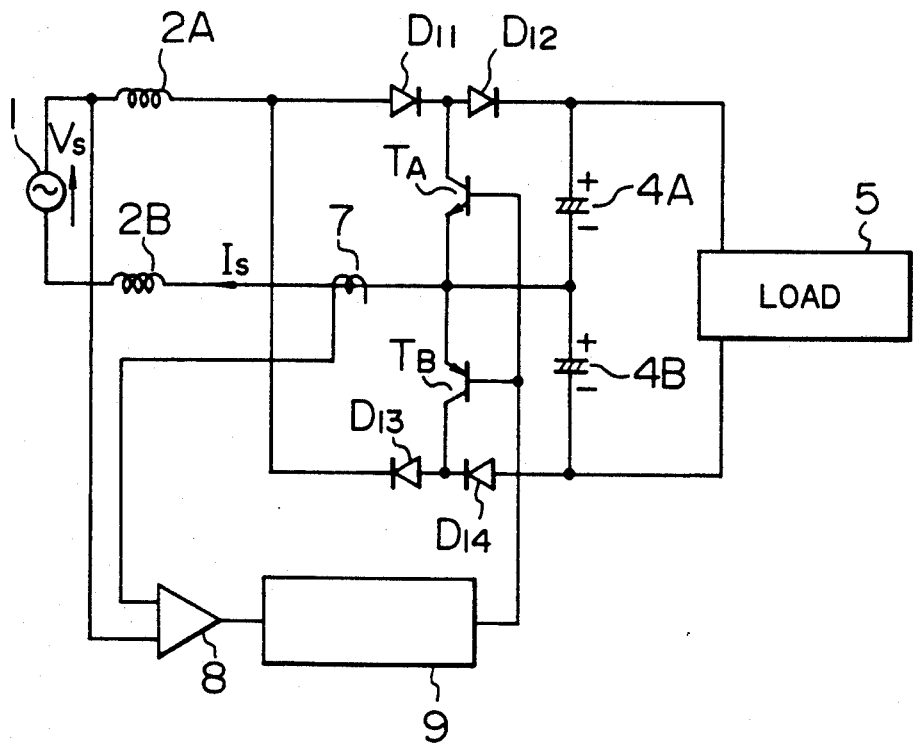
Figure 17:
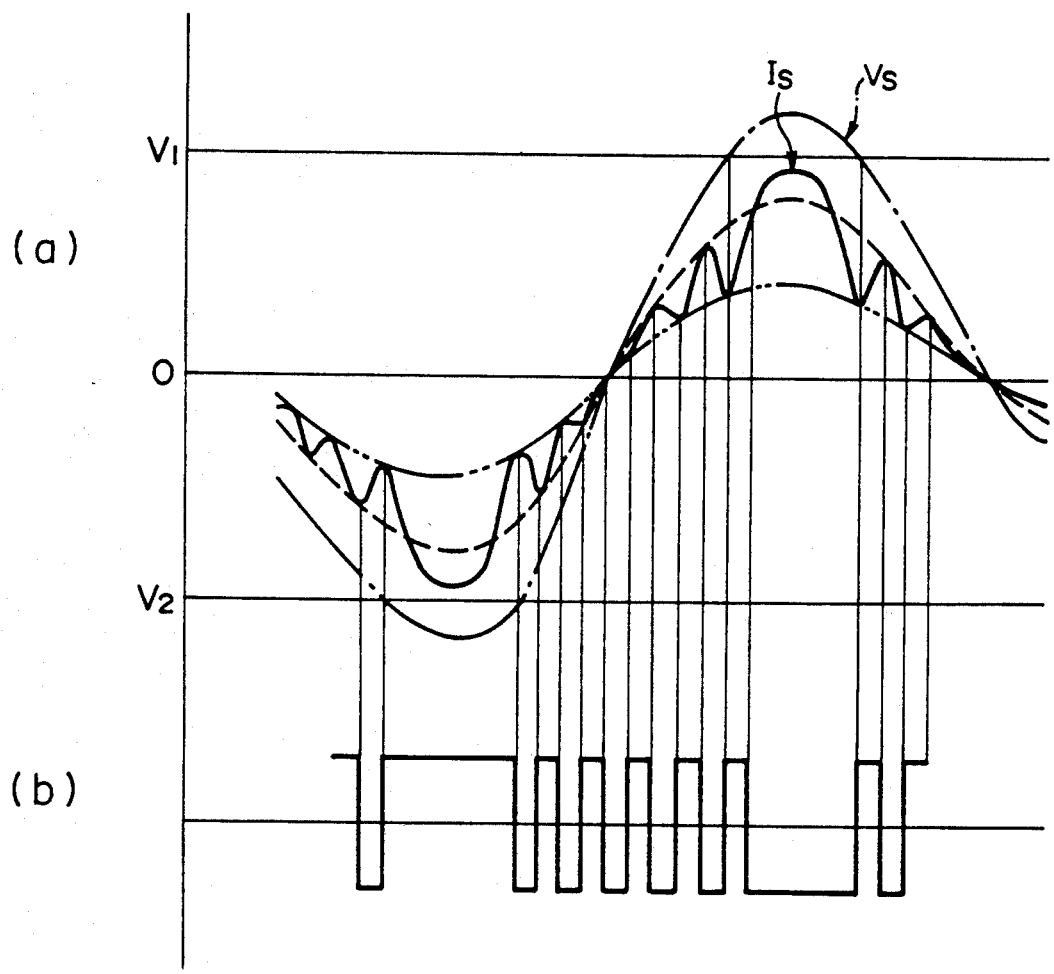
FIG. 17 is a plot showing the operation of the conventional power supply shown in FIG. 16.

The present embodiment has the same arrangement as the conventional power supply using the voltage doubler rectifier circuit shown in FIG. 16, except that the inductors 28a, 28b, the diodes $D_{21a}$, $D_{21b}$, $D_{22a}$, $D_{22b}$, and the transistors $T_a$, $T_b$ are provided in place of the diodes $D_{12}$, $D_{14}$ and the transistors $T_A$ and $T_B$ shown in FIG. 16.

As shown, two series circuits are provided in parallel to the a.c. power supply 1, one series circuit being composed of the inductor 28a, the diode $D_{22a}$ and the npn type transistor $T_a$ and the other series circuit being composed of the inductor 28b, the diode $D_{22b}$ and the pnp type transistor $T_b$. The diode $D_{21a}$ is connected between an anode of the diode $D_{22a}$ and a cathode of the diode $D_{11}$ and the diode $D_{21b}$ is connected between a cathode of the diode $D_{22b}$ and an anode of the diode $D_{13}$.

Next, the operation of this embodiment will be described.

During the period when the a.c. supply voltage $V_s$ having a sinusoidal waveform is a relatively high, this embodiment operates in the same manner as the conventional power supply shown in FIG. 16. The smoothing capacitor 4A is charged during that period while keeping the a.c. supply voltage $V_s$ at the positive polarity indicated by an arrow. The smoothing capacitor 4B is charged during that period while keeping the a.c. supply voltage $V_s$ at a negative polarity opposite to the polarity indicated by the arrow. At this time, the transistors $T_a$ and $T_b$ are switched off.

The transistors $T_a$ and $T_b$ are controlled on and off by the control circuit 101 having two systems of normal chopper circuits.

With the transistor $T_a$ being switched on, the current flows through the inductor 28a, the diode $D_{22a}$ and the transistor $T_a$, resulting in storing energy in the inductor 28a. Then, with the transistor $T_a$ being switched off, the inductor 28a serves to emit the stored energy as a high voltage, resulting in being able to flow current through the inductor 28a, the diode $D_{21a}$, smoothing capacitor 4A, and the a.c. power supply 1. With the transistor $T_b$ being switched on, the current flows through the transistor $T_b$, the diode $D_{22b}$ and the inductor 28b, resulting in storing energy in the inductor 28b. Then, with the transistor $T_b$ being switched off, the inductor 29b serves to emit the stored energy as a high voltage, resulting in being able to flow current through the inductor 28b, the a.c. power supply 1, the smoothing capacitor 4B and the diode $D_{21b}$.

While the transistors $T_a$ and $T_b$ are being controlled on and off, if an absolute value of the a.c. supply voltage $V_s$ is higher than the voltage charged in the smoothing capacitor 4A or 4B, the effect of the energy-storing function of the inductors 28a and 28b brings the diodes $D_{11}$ and $D_{13}$ into a forward-biased state. This results in conducting part of the a.c. load current $I_s$ through one of two loops, one loop composed of the a.c. power supply 1, the inductor 2A, the diode $D_{11}$, the smoothing capacitor 4A and the a.c. power supply 1 or the other loop composed of the a.c. power supply 1, the smoothing capacitor 4B, the diode $D_{13}$, the inductor 2A and the a.c. power supply 1.

Hence, this embodiment makes it possible to produce the a.c. load current $I_s$ having a waveform closing to a sine wave. When the transistors $T_a$ and $T_b$ are controlled on and off if the a.c. supply voltage $V_s$ is a relatively high, part of the a.c. load current is allowed to flow through the transistors $T_a$ and $T_b$. It means that this embodiment is capable of reducing the on-state voltage loss and the switching loss of the transistors $T_a$ and $T_b$ as compared with the conventional power supply shown in FIG. 16 and using as the transistors $T_a$ and $T_b$ small transistors with low capacitance.

What is claimed is:

1. In a power supply including a rectifying section for rectifying a sinusoidal a.c. voltage, a switching section for supplying an output voltage of said rectifying section, and a smoothing section having a smoothing capacitor, said switching section having an inductor and a switching element, said inductor storing energy from current output from said rectifying section during an on-state period of said switching element and emitting said energy to said smoothing section during an off-state period of said switching element, said power supply having a capability of controlling load current to have a sinusoidal waveform comprising:
(1) a first path for conducting current from said rectifying section to said smoothing section;
(2) a second path, in parallel with said first path, for conducting a compensation current from said inductor to said smoothing section;
(3) first current sensing means for sensing the current flowing through said first path;
(4) current waveform means for forming a reference current from the current output from said first current sensing means;
(5) second current sensing means for sensing current flowing through said switching element;
(6) means for determining a conduction ratio of said switching element so that a waveform of an output current of said second current sensing means matches a waveform of said reference current during a period when said reference current flows; and
(7) means for controlling said switching element on and off based on said conduction ratio.

2. A power supply according to claim 1, wherein said means for forming a current waveform includes a high-pass filter having a higher cut-off frequency than the frequency of said a.c. voltage.

3. A power supply according to claim 1, further comprising means for setting both amplification factors of said first and second current sensing means to have a predetermined relation.

4. In a power supply including a rectifying section for rectifying a sinusoidal a.c. voltage, a switching section for supplying an output voltage of said rectifying section, and a smoothing section having a smoothing capacitor, said switching section having an inductor and a switching element, said inductor storing energy from current output from said rectifying section during an on-state period of said switching element and emitting said energy to said smoothing section during an off-state period of said switching element, said power supply having a capability of controlling load current to have a sinusoidal waveform comprising:
(1) a first path for conducting current from said rectifying section to said smoothing section;
(2) a second path for conducting a current from said inductor to said smoothing section;
(3) first current sensing means for sensing the current flowing through said first path;
(4) current waveform means for forming a reference current from the current output from said first current sensing means;
(5) second current sensing means for sensing the current flowing through said switching element;
(6) means for determining a conduction ratio of said switching element so that a waveform of an output current of said second current sensing means matches a waveform of said reference current during a period when said reference current flows; and
(7) means for controlling said switching element on and off based on said conduction ratio, wherein said switching section includes a plurality of switching elements connected in parallel and said means for controlling said switching section on and off includes means for switching sequentially said switching element on and off.

5. A power supply according to claim 4, wherein said switching elements are accommodated as one chip or module in a package.

6. In a power supply including a rectifying section for rectifying a sinusoidal a.c. voltage, a switching section for supplying an output voltage of said rectifying section, and a smoothing section having a smoothing capacitor, said switching section having an inductor and a switching element, said inductor storing energy from current output from said rectifying section during an on-state period of said switching element and emitting said energy to said smoothing section during an off-state period of said switching element, said power supply having a capability of controlling load current to have a sinusoidal waveform comprising:
(1) means for sensing current flowing from said rectifying to said smoothing section;
(2) current waveform forming means for forming a sinusoidal reference current having an amplitude defined according to an average value of the output current of said current sensing means and a frequency equal to said a.c. voltage;
(3) means for determining a conduction ratio of said switching element so that a waveform of an output current of said second current sensing means matches a waveform of said reference current during a period when said reference current flows; and
(4) means for controlling said switching element on and off based on said conduction ratio, wherein said switching section includes a plurality of switching elements connected in parallel and said means for controlling said switching section on and off includes means for switching sequentially said switching elements on and off.

7. A power supply according to claim 6, wherein said switching elements are accommodated as one chip or module in a package.

8. In a power supply including a rectifying section for rectifying a sinusoidal a.c. voltage, a switching section for supplying an output voltage of said rectifying section, and a smoothing section having a smoothing capacitor, said switching section having an inductor and a switching element, said inductor storing energy from current output from said rectifying section during an on-state period of said switching element and emitting said energy to said smoothing section during an off-state period of said switching element, said power supply having a capability of controlling load current to have a sinusoidal waveform comprising:
(1) a first path of conducting current from said rectifying section to one polarity side of said smoothing section; and
(2) a second path for conducting current from said inductor to the same polarity side of said smoothing section of said first path.

9. In a power supply including a rectifying section for rectifying a sinusoidal a.c. voltage, a switching section for supplying an output voltage of said rectifying section, and a smoothing section having a smoothing capacitor, said switching section having an inductor and a switching element, said inductor storing energy from current output from said rectifying section during an on-state period of said switching element and emitting said energy to said smoothing section during an off-state period of said switching element, said power supply having a capability of controlling load current to have a sinusoidal waveform comprising:
(1) a first path for conducting current from said rectifying section to said smoothing section; and (2) a second path for conducting current from said inductor to the same polarity side of said smoothing section of said first path; and said plurality of switching elements connected in parallel; and means for sequentially controlling said switching elements on an off.

10. A power supply according to claim 9, wherein said switching elements are accommodated as one chip or module in a package.

11. In a power supply including rectifying sections, a switching section for receiving the output voltage of said rectifying sections, and a smoothing section having a smoothing capacitor, said power supply having a capability of controlling a load current to have a sinusoidal waveform and said switching section being located between said rectifying section and said smoothing section, said switching section comprising:

(1) a circuit having two or more series circuits each composed of inductors and switching elements, said series circuits being connected in parallel;

(2) a rectifier elements connected to contacts between said inductors and said switching elements;

(3) a current path for supplying energy to said smoothing section through said rectifier elements; and (4) means for controlling said switching elements on and off.

12. A power supply according to claim 11, wherein said means for controlling said switching elements on and off includes means for sequentially controlling said switching elements on and off.

13. In a power supply including voltage doubler rectifying sections for rectifying a sinusoidal a.c. voltage, a switching section for receiving the output voltage of said voltage doubler rectifying sections and a smoothing section having smoothing capacitors, said power supply having a capability of controlling a load current to have a sinusoidal waveform and said switching section being located between said voltage doubler rectifying sections and said smoothing section, said switching section comprising:

(1) a circuit having two series circuits each composed of an inductor, a first rectifier element and a switching element, said two series circuits being connected to an a.c. voltage generator in parallel;

(2) a current path for supplying energy from a later stage of said inductors to said smoothing section through second rectifier elements; and (3) means for controlling said switching element on and off if the output voltage of said rectifying section is equal to or lower than a predetermined value.

14. A power supply according to claim 13, wherein said means for controlling said switching element on and off includes means for sequentially controlling said switching elements on and off.

15. In a power supply including a rectifying section for rectifying a sinusoidal a.c. voltage, a switching section for receiving a voltage output from said rectifying section, and a smoothing section having a smoothing capacitor, said switching section having an inductor and switching elements, said inductor storing energy from the output current of said rectifying section during an on-state period of said switching element and emitting said stored energy to said smoothing section during an off-state period of said switching elements, said power supply having a capability of controlling a load current to have a sinusoidal waveform and said switching section comprising:

(1) a plurality of said switching elements; and (2) means for sequentially controlling said switching elements.

* * * * *